US012236850B2

(12) United States Patent
Jang et al.

(10) Patent No.: US 12,236,850 B2
(45) Date of Patent: Feb. 25, 2025

(54) TWO-DIMENSIONAL TEMPERATURE SENSING AND COMPENSATION

(71) Applicant: Apple Inc., Cupertino, CA (US)

(72) Inventors: Sunmin Jang, Sunnyvale, CA (US); Ce Zhang, Cupertino, CA (US); Hopil Bae, Palo Alto, CA (US); Mahdi Farrokh Baroughi, Santa Clara, CA (US); Pablo Moreno Galbis, Burlingame, CA (US); Paolo Sacchetto, Cupertino, CA (US); Yaser Azizi, Santa Clara, CA (US); Young Don Bae, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/334,914

(22) Filed: Jun. 14, 2023

(65) Prior Publication Data

US 2024/0005850 A1 Jan. 4, 2024

Related U.S. Application Data

(60) Provisional application No. 63/356,544, filed on Jun. 29, 2022.

(51) Int. Cl.
*G09G 3/32* (2016.01)

(52) U.S. Cl.
CPC ......... *G09G 3/32* (2013.01); *G09G 2320/041* (2013.01); *G09G 2320/0626* (2013.01)

(58) Field of Classification Search
CPC ..... G09G 2320/041; G09G 2320/0626; G09G 3/32
See application file for complete search history.

(56) References Cited

U.S. PATENT DOCUMENTS

| | | | | |
|---|---|---|---|---|
| 10,453,432 | B2 * | 10/2019 | Lin | G09G 3/20 |
| 11,217,142 | B1 * | 1/2022 | Buckley | G06T 5/10 |
| 11,232,745 | B2 * | 1/2022 | Holsteen | G09G 3/3625 |
| 2016/0155384 | A1 * | 6/2016 | Kim | G09G 3/2025 345/82 |
| 2017/0143214 | A1 | 5/2017 | Garibotto et al. | |
| 2019/0113398 | A1 | 4/2019 | Comas et al. | |
| 2019/0339131 | A1 | 11/2019 | Finn | |
| 2020/0388233 | A1 * | 12/2020 | Holsteen | G09G 3/3607 |

FOREIGN PATENT DOCUMENTS

| | | | |
|---|---|---|---|
| CN | 114495823 A | * | 5/2022 |

* cited by examiner

*Primary Examiner* — Kenneth Bukowski
(74) *Attorney, Agent, or Firm* — Fletcher Yoder, P.C.

(57) ABSTRACT

To reduce image artifacts induced by temperature variations associated with display pixels of an electronic display, processing circuitry may process temperature sensing data to obtain an average temperature and a temperature distribution of the electronic display. Based on the processed temperature data, the processing circuit may adjust a reference voltage applied to the display pixels to compensate for the average temperate. To further correct for the image artifacts, the processing circuitry may transform image data to luminance domain. Based on the processed temperature data, the processing may adjust luminance vales of the image data to compensate for the temperature distribution.

21 Claims, 14 Drawing Sheets

TWO-DIMENSIONAL TEMPERATURE SENSING AND COMPENSATION

CROSS-REFERENCE TO RELATED APPLICATIONS

This application claims priority to U.S. Application No. 63/356,544, entitled "Two-Dimensional Temperature Sensing and Compensation," filed Jun. 29, 2022, which is hereby incorporated by reference in its entirety for all purposes.

BACKGROUND

The present disclosure relates generally to electronic devices with display panels, and more particularly, to temperature measurement and compensation for a display panel of an electronic device operating over a wide range of temperature.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Numerous electronic devices—such as computers, mobile phones, portable media devices, tablets, televisions, virtual-reality headsets, and vehicle dashboards, among many others—often include or use electronic displays to display images that present visual representations of information. An electronic display may generally display an image by actively controlling light emission from display pixels. By adjusting the brightness of different color components (e.g., sub-pixels) of the display pixels, a variety of different colors may be generated that collectively produce a corresponding image.

Some electronic devices may operate over a wide range of temperatures (e.g., from 20° C. to 50° C.). The temperature of an electronic display on such a device may vary accordingly. With such dramatic temperature variation, not only may the average temperature of the entire electronic display change, but the relative temperature of different areas of the electronic display may also change. One of the display features that may be influenced by the temperature variation is color. Different colors of pixels of the electronic display may behave differently at different temperatures. As such, wide variation in temperature may cause color artifacts to appear on the electronic display.

Electronic displays with self-emissive display pixels produce their own light. The self-emissive display pixels may include any suitable light-emissive elements, including light-emitting diodes (LEDs) such as organic light-emitting diodes (OLEDs) or micro-light-emitting diodes (micro-LED or μLEDs). Different display pixels may emit different colors. For example, some of the display pixels may emit red light, some may emit green light, and some may emit blue light. Thus, the display pixels may be driven to emit light at different brightness levels to cause a user viewing the display to perceive an image formed from different colors of light. The display pixels may also correspond to sub-pixels of pixels of other color combinations, such as cyan (C), magenta (M), and yellow (Y), or the like. As used in this disclosure, the term "display pixel" refers to a sub-pixel (e.g., a red, green, or blue sub-pixel of an RGB pixel; a cyan, magenta, or yellow sub-pixel of a CMY pixel) of an electronic display.

The electronic display may take a variety of forms. For example, the electronic display may be a digital display such as a micro-LED display. A micro-LED display includes active matrixes of micro-LEDs, pixel drivers (e.g., referred to as micro-drivers), anodes, and arrays of row and column drivers. Each micro-driver may drive a number of display pixels on the electronic display. For example, each micro-driver may be connected to numerous anodes, and each anode may selectively connect to multiple different display pixels (one at a time). Thus, a collection of display pixels may share a common anode connected to a micro-driver. The micro-driver may drive a display pixel by providing a driving signal across an anode to one of the collection of display pixels. Any suitable number of display pixels may be located on respective anodes of the micro-LED display. Moreover, the collection of display pixels located on each anode may be the same particular color (e.g., red, green, blue).

In some cases, the electronic display may operate in an environment with large temperature variations. For example, the electronic display may display bright images (e.g., images with high luminance) for a long duration of time, or contact with a thermal source (e.g., human body), which may cause large temperature variations (e.g., temperature increase). The temperature variations may include a change of an average temperature of the entire electronic display and relative temperature changes of different areas of the electronic display. The temperature variations may impact on certain display parameters having temperature dependencies, causing abnormal display parameter results such as micro-LED external quantum efficiency (EQE) mismatch, display pixel driving current mismatch, capacitance mismatch, and so on. Such abnormal display parameter results may influence certain display characteristics such as color. Display pixels emitting different colors may behave differently at different temperatures. As such, large temperature variations may cause color artifacts to appear on the electronic display. The color artifacts resulting from display temperature variations may disrupt the desired effect or experience for users when viewing image content on the micro-LED display. Yet replacing entire micro-LED displays due to the display temperature variations may be costly, time consuming, and inefficient. Accordingly, sensing and compensating for display temperature variations may be desirable to manufacturers as well as to users viewing the image content on the micro-LED displays.

Accordingly, the present disclosure provides techniques for reducing the influences on an electronic display (e.g., micro-LED display) caused by display temperature variations. Display temperature data (e.g., a temperature distribution profile indicating the display temperature variations) may be measured across the electronic display using temperature sensors (e.g., a temperature sensor matrix). The temperature sensors may be distributed on the electronic display. For example, each temperature sensor may be deployed at a specific location close to a respective micro-driver. The temperature sensors may be activated to measure the display temperature data based on a pre-defined order (e.g., a portion of the temperature sensors may be active at a time while the other portion of the temperature sensors may be inactive).

Based on the display temperature data measured by the temperature sensors, various temperature-related corrections may be performed (e.g., by processing circuitry) to compensate for the display temperature variations. Such temperature-related corrections may offset or cancel out the color artifacts caused by the display temperature variations.

For example, an analog correction may be applied to all the display pixels of the electronic display to compensate for the display temperature variations based on an average temperature on the electronic display. The average temperature may be calculated based on the display temperature data measured by the temperature sensors at different locations. The analog correction may include a global pixel current compensation (e.g., by applying the same adjustment of the display pixel driving current to all the display pixels) to account for current average temperature on the micro-LED display.

The temperature-related corrections may also include a digital correction on the image data. The digital correction may involve two corrections: one correction corresponds to a temperature effect on the external quantum efficiency (EQE) of each display pixel, and another correction corresponds to the temperature effect on driving circuitry (e.g., micro-driver) of each display pixel. The digital correction may take place using image data that has been transformed into a luminance domain. The digital correction may include obtaining a two-dimensional temperature map indicating a temperature distribution on the micro-LED display based on the display temperature data measured by the temperature sensors. Various interpolations may be used to obtain the two-dimensional temperature map. For example, an interpolation may be applied to the display temperature data (e.g., measured at an activated temperature sensor granularity) to obtain a finer (e.g., higher resolution) temperature distribution profile at the micro-driver granularity. The finer temperature distribution profile at the micro-driver granularity may be further interpolated to obtain the two-dimensional temperature map at the display pixel granularity.

Using the two-dimensional temperature map, the temperature at a display pixel may be used to obtain a first correction based on the temperature on the display pixel, which may be applied to the image data corresponding to that display pixel. Additionally, the two-dimensional temperature map may be used to obtain the temperature at the display pixel driving circuitry (e.g., micro-driver). A second correction based on the temperature of the micro-driver may be obtained and applied to the image data corresponding to that micro-driver. The digital correction, including the first and the second corrections, may mitigate adverse effects of temperature variations on the micro-LED display.

In some embodiments, the micro-LED display may be part of an electronic device. In other embodiments, the micro-LED display may be part of an external electronic display communicatively coupled to the electronic device. Processing circuitry (e.g., image processing circuit (IPC), image compensation circuit, driver integrated circuit (DIC)) of the electronic device or the micro-LED display may receive the image data associated with displaying image content on the micro-LED display. In other embodiments, the processing circuitry may generate the image data.

When the processing circuitry receives the image data corresponding to a display pixel of the micro-LED display, the image data may be defined as gray levels for the various display pixels. Pixel by pixel, the processing circuitry may convert a gray level of the image data into a luminance value in the luminance domain representing an amount of light corresponding to the gray level. To compensate for temperature variations associated with each display pixel, the processing circuitry may apply the first correction based on the temperature of the display pixel to adjust the luminance value for that display pixel. Additionally, to compensate for temperature variations associated with each micro-driver, the processing circuitry may apply the second correction based on the temperature of the micro-driver. The processing circuitry may determine correction coefficients associated with the first and second corrections based on tables (e.g., lookup table (LUT)) that indicate respective correction coefficients applied to luminance values of respective display pixels or respective micro-drivers to compensate for temperature variations on the electronic display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
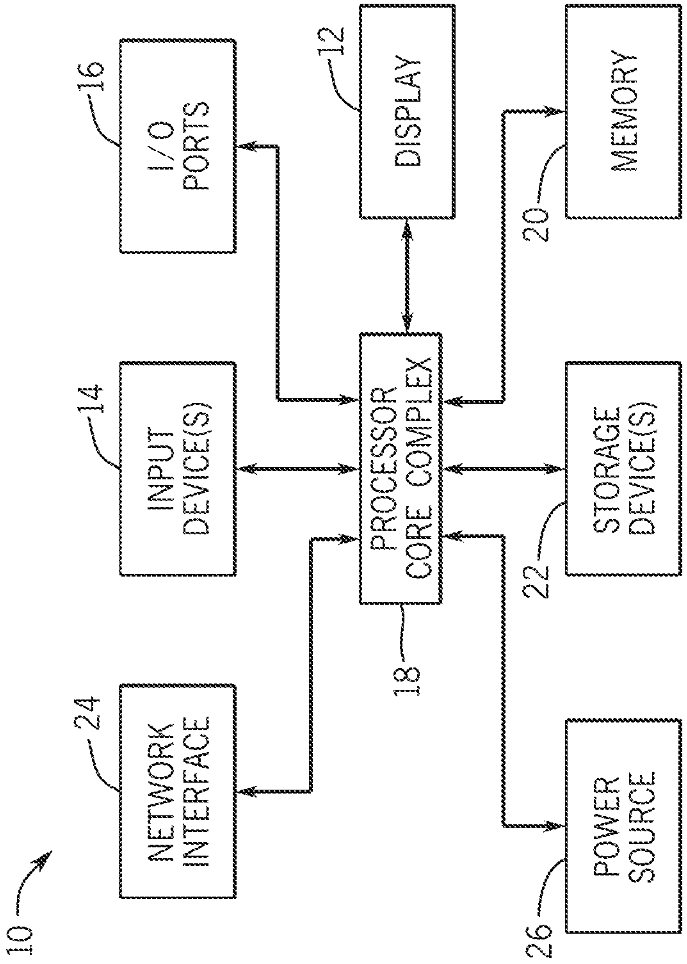
FIG. 1 is a block diagram of an electronic device with an electronic display, in accordance with an embodiment.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

In addition to enabling user inputs, the electronic display 12 may be a display panel with one or more display pixels. For example, the electronic display 12 may include a self-emissive pixel array having an array of one or more of self-emissive pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as a LED or a micro-LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

Figure 2:
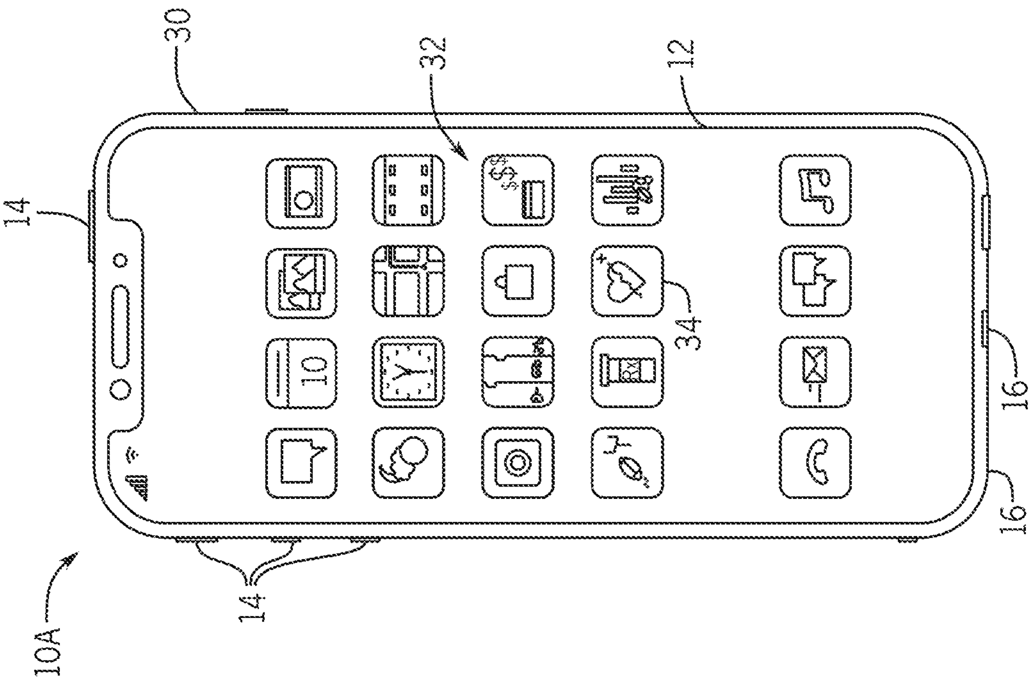
FIG. 2 is a front view of a handheld device representing another embodiment of the electronic device of FIG. 1, in accordance with an embodiment.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
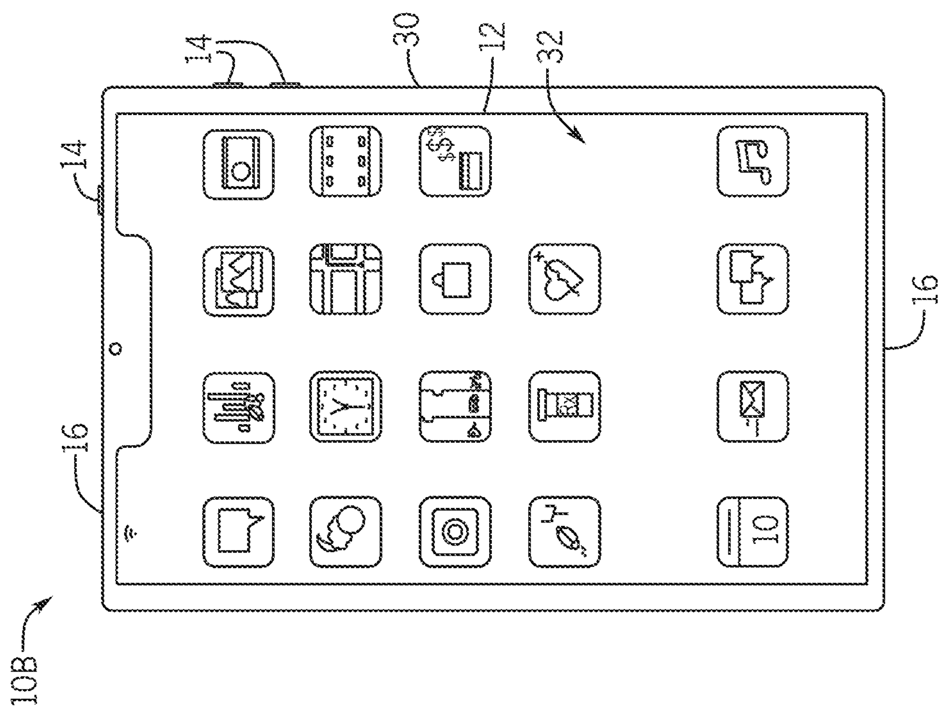
FIG. 3 is a front view of another handheld device representing another embodiment of the electronic device of FIG. 1, in accordance with an embodiment.
Figure 4:
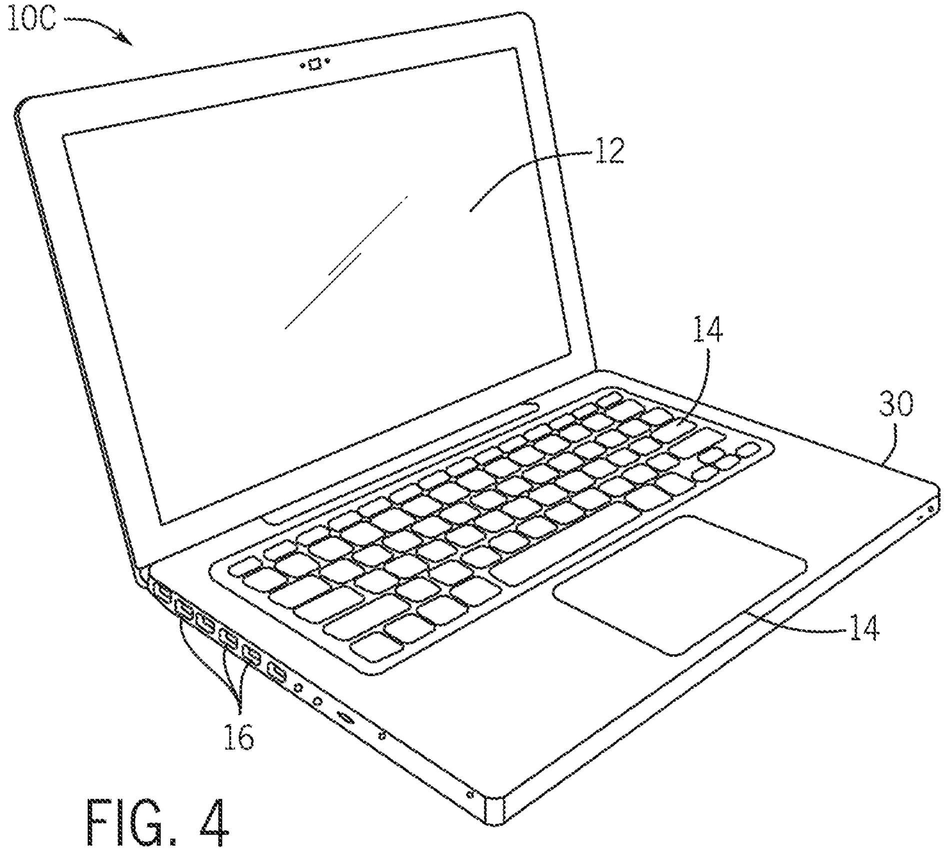
FIG. 4 is a perspective view of a notebook computer representing an embodiment of the electronic device of FIG. 1, in accordance with an embodiment.
Figure 5:
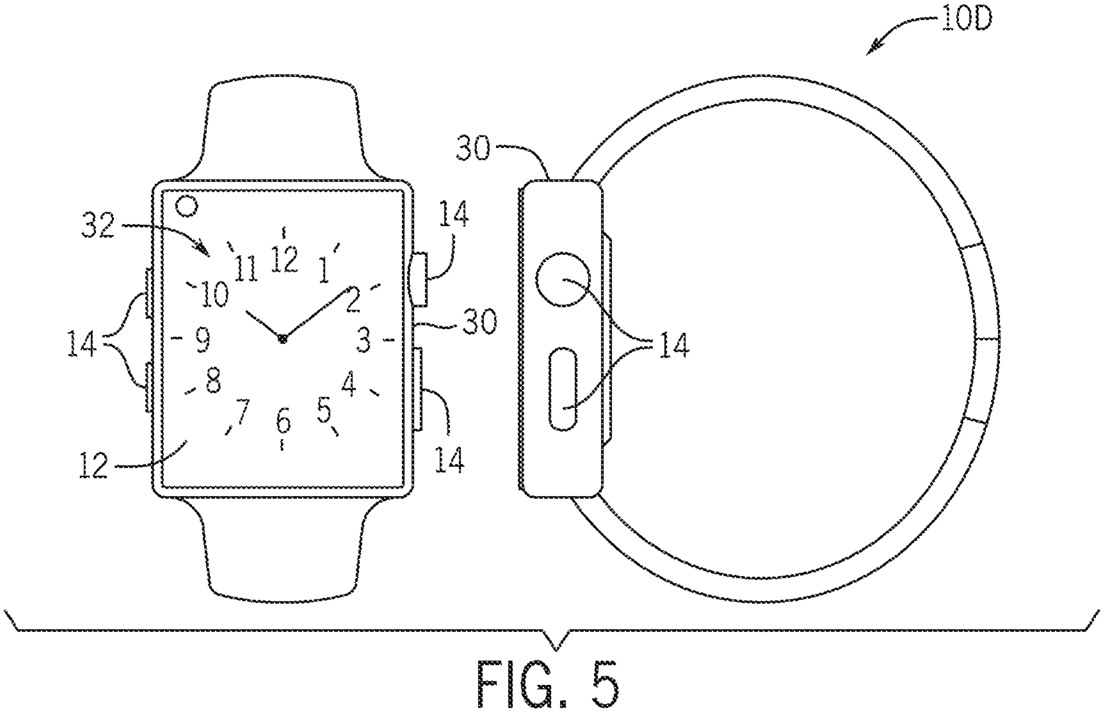
FIG. 5 is a front view and side view of a wearable electronic device representing another embodiment of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes the electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
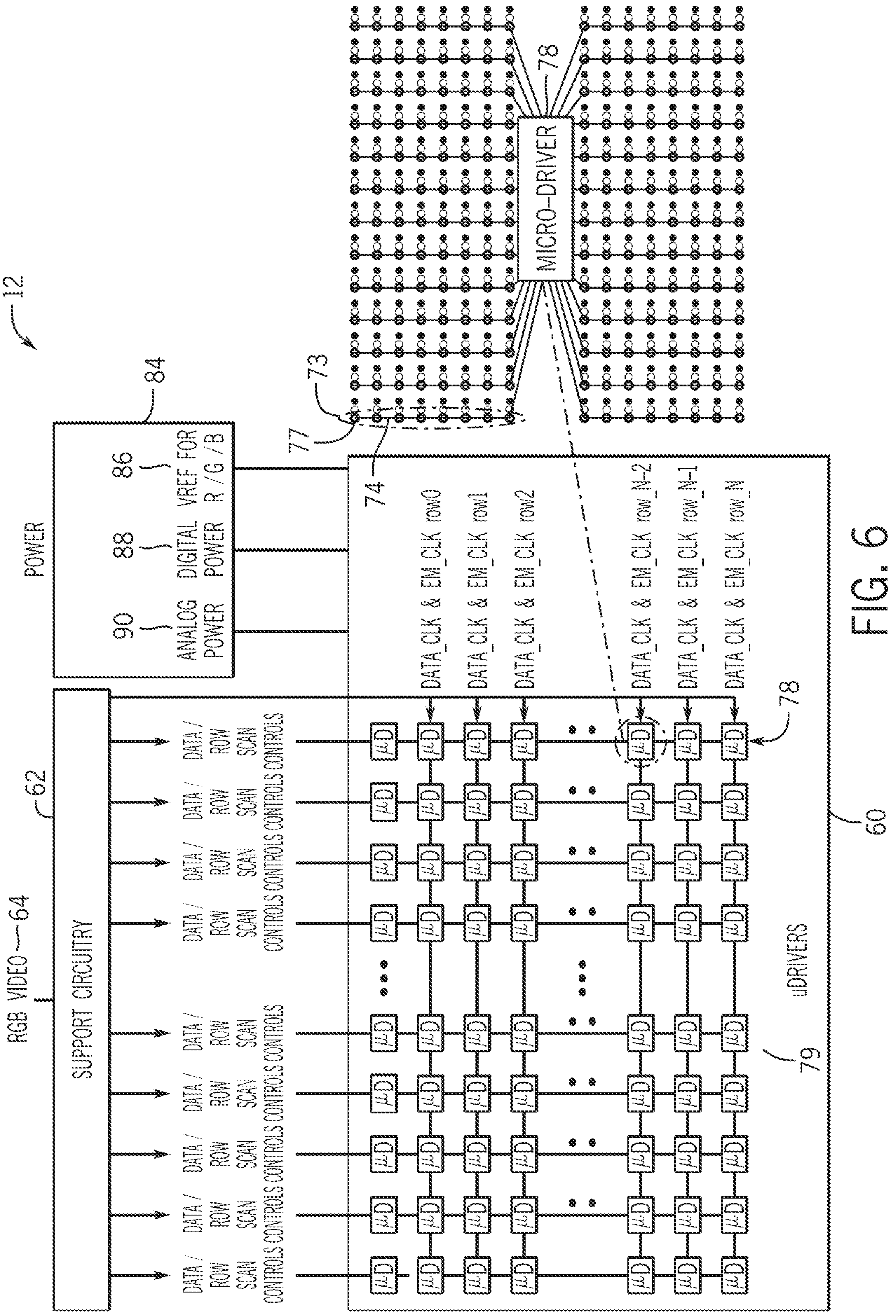
FIG. 6 is a block diagram of a micro-LED display that employs micro-drivers to drive display pixels with controls signals, in accordance with an embodiment.

FIG. 6 depicts a block diagram of an example architecture of the electronic display 12 (e.g., micro-LED display 12). In the example of FIG. 6, the micro-LED display 12 uses an RGB display panel 60 with pixels that include red, green, and blue micro-LEDs as display pixels. Support circuitry 62 may receive image data 64 (e.g., RGB-format video image dataset). It should be appreciated, however, that the micro-LED display 12 may display other formats of image data, in which case the support circuitry 62 may receive image data of such different image format. In some embodiments, the support circuitry 62 may include a video timing controller (video TCON) and/or emission timing controller (emission TCON) that receives and uses the image data 64 in a serial bus to determine a data clock signal (DATA_CLK) and/or an emission clock signal (EM_CLK) to control the provision of the image data 64 in the micro-LED display 12. The video TCON may also pass the image data 64 to a serial-to-parallel circuitry that may deserialize the image data 64 signal into several parallel image data signals. That is, the serial-to-parallel circuitry may collect the image data 64 into the particular data signals that are passed on to specific columns among a total of M respective columns in the RGB display panel 60. As noted above, the video TCON may generate the data clock signal (DATA_CLK), and the emission TCON may generate the emission clock signal (EM_CLK). Collectively, these may be referred to as Data/Row Scan Control signals, as illustrated in FIG. 6. As such, the data is labeled DATA/ROW SCAN CONTROLS. The data/row scan controls respectively contain image data corresponding to pixels in the first column, second column, third column, fourth column . . . fourth-to-last column, third-to-last column, second-to-last column, and last column, respectively. The data/row scan controls may be collected into more or fewer columns depending on the number of columns that make up the RGB display panel 60.

In particular, the RGB display panel 60 columns include micro-drivers 78. The micro-drivers 78 are arranged in an array 79. The micro-drivers 78 may receive and/or pass on various signals sent from the support circuitry 62. By way of example, micro-drivers 78 on the left-hand side of the display may receive row scan control signals and pass those signals that correspond to its particular row to other micro-drivers 78 in that row of micro-drivers. Each micro-driver 78 drives a number of display pixels 77. Different display pixels (e.g., display sub-pixel) 77 may include different colored micro-LEDs (e.g., a red micro-LED, a green micro-LED, or a blue micro-LED) to represent the image data 64 in RGB format. Although one of the micro-drivers 78 of FIG. 6 is shown to drive twenty-six anodes 73 having eight display pixels 77 each, each micro-driver 78 may drive more or fewer anodes 73 (e.g., 8 anodes, 9 anodes, 10 anodes, 11 anodes, 12 anodes, 14 anodes, 15 anodes, 16 anodes, 17 anodes, 18 anodes, and so forth) and respective display pixels 77. As illustrated, the subset of display pixels 77 located on each anode 73 may be associated with a particular color (e.g., red, green, or blue). As mentioned above, it should be noted that a respective cathode corresponds to a subset of display pixels 77 associated with a particular color even though each cathode for a particular color channel is not illustrated in FIG. 6. For example, cathode 74 corresponds to a red color channel (e.g., subset of red display pixels 77). There may be a second set of cathodes that couple to a green color channel (e.g., subset of green display pixels 77) and a third set of cathodes that couple to a blue color channel (subset of blue display pixels 77), but these are not expressly illustrated in FIG. 6 for ease of illustration.

A power supply 84 may provide a reference voltage (VREF) 86 to drive the micro-LEDs, a digital power signal 88, and an analog power signal 90. In some cases, the power supply 84 may provide more than one reference voltage (VREF) 86 signal. Namely, display pixels 77 of different colors may be driven using different reference voltages. As such, the power supply 84 may provide more than one reference voltage (VREF) 86. Additionally or alternatively, other circuitry on the RGB display panel 60 may step the reference voltage (VREF) 86 up or down to obtain different reference voltages to drive different colors of micro-LED.

Figure 7:
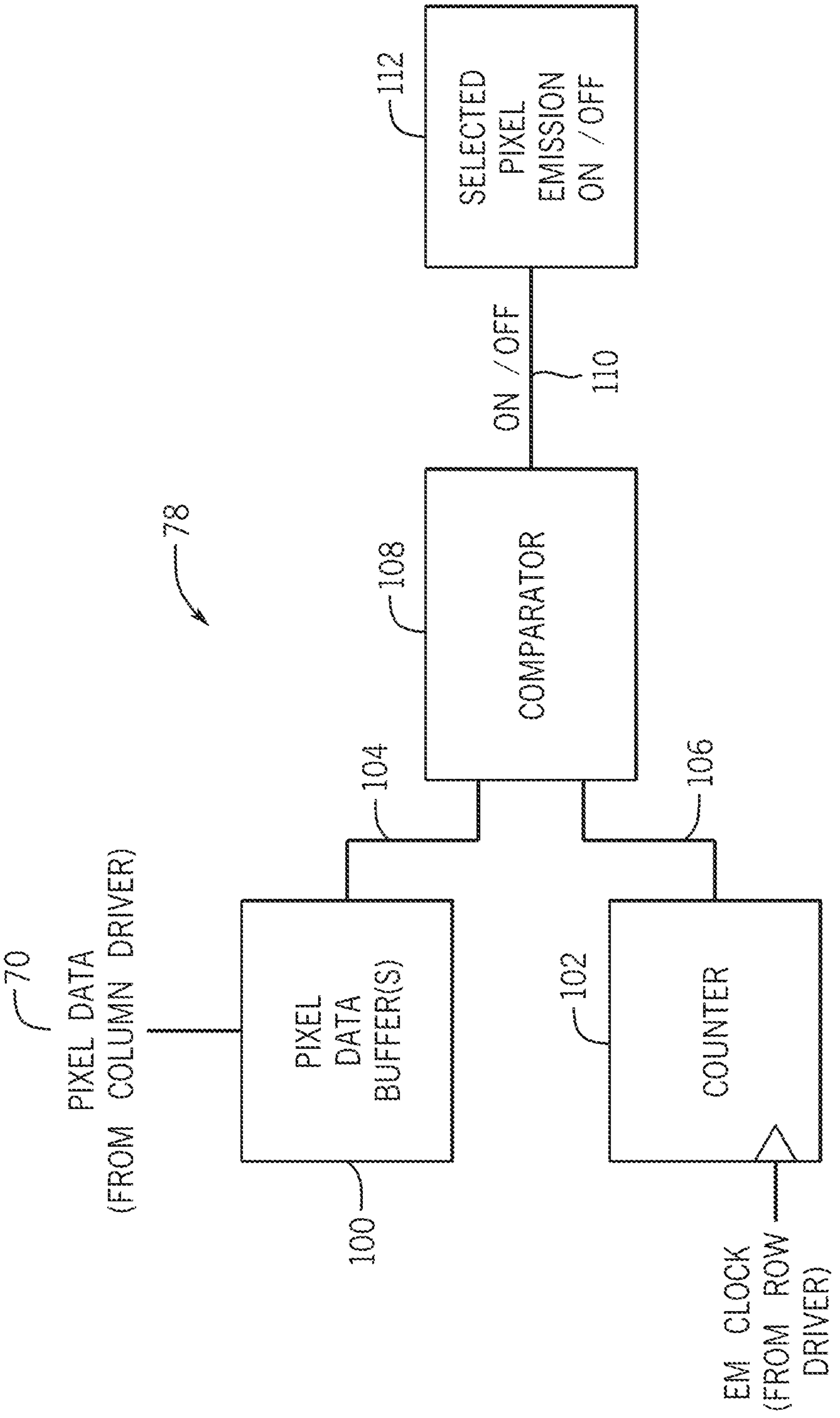
FIG. 7 is a block diagram schematically illustrating an operation of a micro-driver of FIG. 6, in accordance with an embodiment.

A block diagram shown in FIG. 7 illustrates some of the components of one of the micro-drivers 78. The micro-driver 78 shown in FIG. 6 includes pixel data buffer(s) 100 and a digital counter 102. The pixel data buffer(s) 100 may include sufficient storage to hold image data 70 that is provided (e.g., as a digital code). For instance, the micro-driver 78 may include pixel data buffers to store the image data 70 for a display pixel 77 at any one time (e.g., for 8-bit image data 70, this may be 24 bits of storage). It should be appreciated, however, that the micro-driver 78 may include more or fewer buffers, depending on the data rate of the image data 70 and the number of display pixels 77 included in the image data 70. The pixel data buffer(s) 100 may take any suitable logical structure based on the order that the column driver provides the image data 70. For example, the pixel data buffer(s) 100 may include a first-in-first-out (FIFO) logical structure or a last-in-first-out (LIFO) structure.

When the pixel data buffer(s) 100 has received and stored the image data 70, the micro-driver 78 may provide an emission clock signal (EM_CLK). The digital counter 102 may receive the emission clock signal (EM_CLK) as an input. The pixel data buffer(s) 100 may output enough of the stored image data 70 to output a digital data signal 104 represent a desired gray level for a particular display pixel 77 that is to be driven by the micro-driver 78. The digital counter 102 may also output a digital counter signal 106 indicative of the number of edges (only rising, only falling, or both rising and falling edges) of the emission clock signal (EM_CLK). The digital data signal 104 and digital counter signal 106 may enter a comparator 108 that outputs an emission control signal 110 in an "on" state when the digital counter signal 106 does not exceed the signal 104, and an "off" state otherwise. The emission control signal 110 may be routed to driving circuitry (not shown) for the display pixel 77 being driven, which may cause light emission 112 from the selected display pixel 77 to be on or off. The longer the selected display pixel 77 is driven "on" by the emission control signal 110, the greater the amount of light that will be perceived by the human eye as originating from the display pixel 77.

Figure 8:
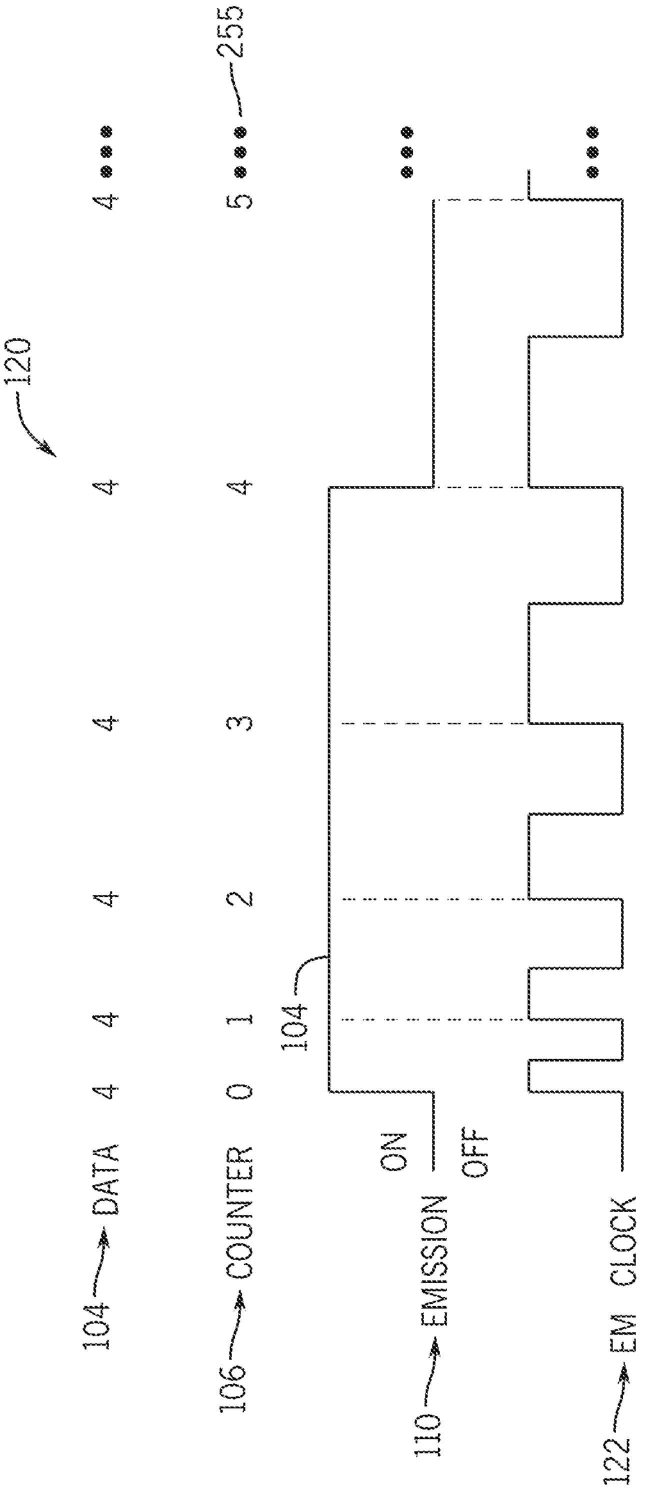
FIG. 8 is a timing diagram illustrating an example operation of the micro-driver of FIG. 7, in accordance with an embodiment.

A timing diagram 120, shown in FIG. 8, provides one brief example of the operation of the micro-driver 78. The timing diagram 120 shows the digital data signal 104, the digital counter signal 106, the emission control signal 110, and the emission clock signal (EM_CLK) represented by numeral 122. In the example of FIG. 8, the gray level for driving the selected display pixel 77 is gray level 4, and this is reflected in the digital data signal 104. The emission control signal 110 drives the display pixel 77 "on" for a period of time defined as gray level 4 based on the emission clock signal (EM_CLK). Namely, as the emission clock signal (EM_CLK) rises and falls, the digital counter signal 106 gradually increases. The comparator 108 outputs the emission control signal 110 to an "on" state as long as the digital counter signal 106 remains less than the data signal 104. When the digital counter signal 106 reaches the data signal 104, the comparator 108 outputs the emission control signal 110 to an "off" state, thereby causing the selected display pixel 77 no longer to emit light.

It should be noted that the steps between gray levels are reflected by the steps between emission clock signal (EM_CLK) edges. That is, based on the way humans perceive light, to notice the difference between lower gray levels, the difference between the amounts of light emitted between two lower gray levels may be relatively small. To notice the difference between higher gray levels, however, the difference between the amounts of light emitted between two higher gray levels may be comparatively much greater. The emission clock signal (EM_CLK) therefore may use relatively short time intervals between clock edges at first. To account for the increase in the difference between light emitted as gray levels increase, the differences between edges (e.g., periods) of the emission clock signal (EM_CLK) may gradually lengthen. The particular pattern of the emission clock signal (EM_CLK), as generated by the emission TCON, may have increasingly longer differences between edges (e.g., periods) so as to provide a gamma encoding of the gray level of the display pixel 77 being driven.

Figure 9:
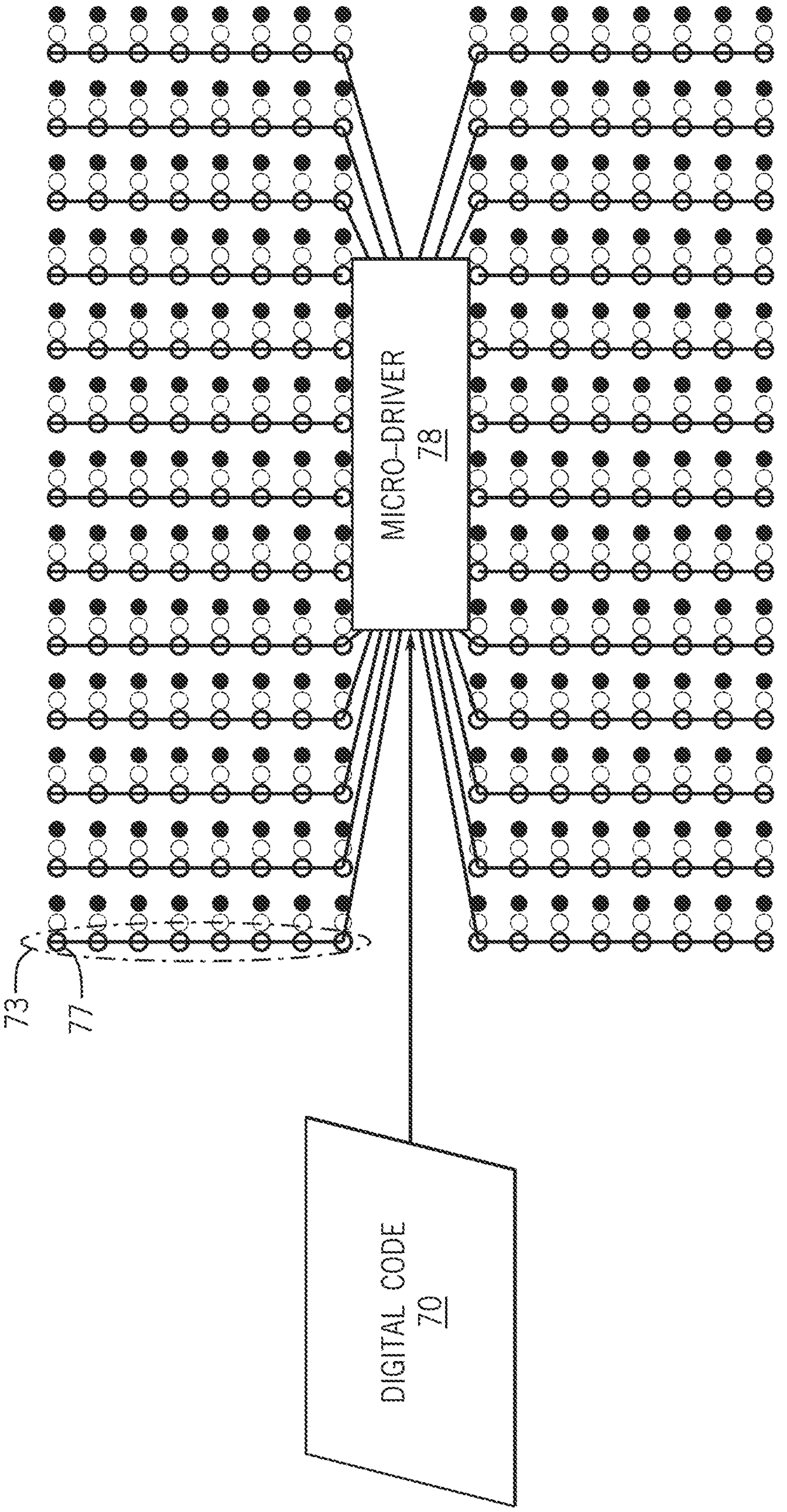
FIG. 9 is a schematic illustration of the micro-LED display of FIG. 6, where a micro-driver controls a collection of display pixels based on a digital code, in accordance with an embodiment.

With the preceding in mind, FIG. 9 illustrates the micro-driver 78 driving the display pixels 77 according to the image data 70 in the form of a digital code, and thereby enabling image content to be displayed by the micro-LED display 12. As mentioned above, the micro-driver 78 may drive any suitable number of display pixels 77, and a subset of display pixels 77 may be located on respective anodes 73 of the micro-LED display 12. As illustrated, the subset of display pixels 77 located on each anode 73 may be associated with a particular color (e.g., red, green, blue). Further, it should be noted that a respective cathode corresponds to a subset of display pixels 77 associated with a particular color even though each cathode for a particular color channel is not illustrated in FIG. 9. For example, as illustrated, a first set of cathodes corresponds to a red color channel (e.g., subset of red display pixels 77). However, there may be a second set of cathodes that couple to a green color channel (e.g., subset of green display pixels 77) and a third set of cathodes that couple to a blue color channel (subset of blue display pixels 77). The second set of cathodes and the third set of cathodes are not expressly illustrated in FIG. 9 for ease of illustration.

Figure 10:
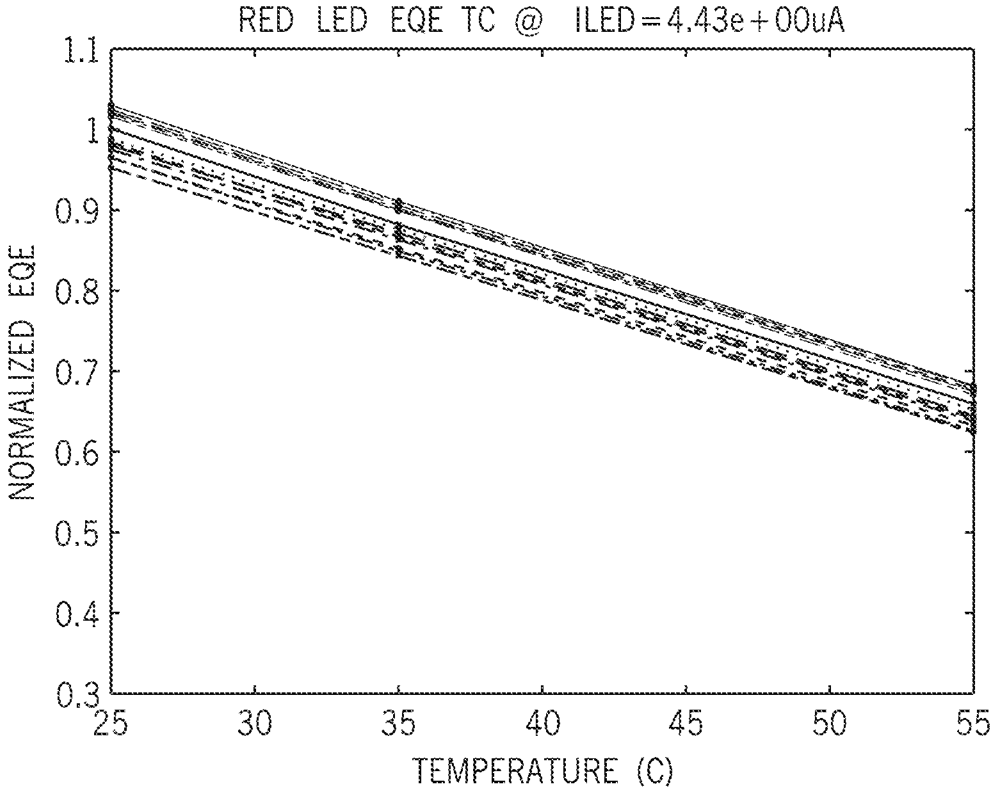
FIG. 10 is a graph depicting the external quantum efficiency (EQE) of micro-LED display pixels vs. temperature, in accordance with an embodiment.

In some cases, the image content displayed by the micro-LED display may include color artifacts due to certain abnormal display parameter results such as micro-LED external quantum efficiency (EQE) mismatch, display pixel driving current mismatch, capacitance mismatch, and so forth. Such abnormal display parameter results may be caused by display temperature variations. The micro-LED EQE and display pixel driving current have temperature dependencies. For example, 4500 nits (a metric for measuring luminance) at 45% average pixel level or average pixel luminance (APL) may induce 25° C. temperature change across a micro-LED display panel. For another example, 30 seconds touch with 8° C. ambient temperature may induce 22° C. temperature change. As shown in FIG. 10, the EQE is lower at higher temperatures. Thus, without temperature-related corrections (e.g., the analog and digital corrections mentioned above), color artifacts may be severe due to large temperature variations across the micro-LED display.

The temperature-related corrections in the present disclosure may be based on certain conditions. One condition is related to the micro-LED external quantum efficiency (EQE) vs. temperature characteristic. FIG. 10 is a graph depicting the EQE of micro-LED display pixels vs. temperature. As illustrated, the EQE vs. temperature characteristic is global across a micro-LED display panel.

Figure 11:
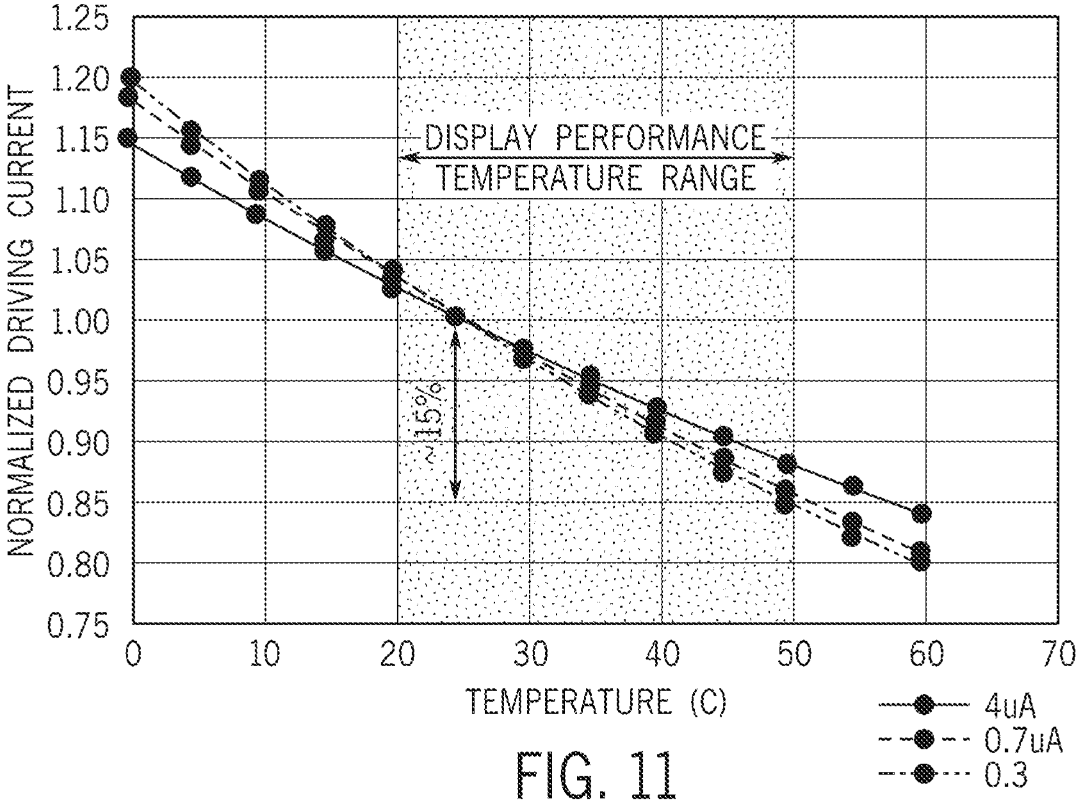
FIG. 11 is a graph depicting the driving current of micro-LED display pixels vs. temperature, in accordance with an embodiment.

Another condition is related to the driving current of micro-LED display pixels vs. temperature characteristic. FIG. 11 is a graph depicting the driving current of micro-LED display pixels vs. temperature. As illustrated, the driving current of micro-LED display pixels vs. temperature characteristic is global across the micro-LED display panel. In FIG. 11, three curves represent red, green, and blue, respectively, which illustrate different colors have different temperature dependencies. Indeed, at lower temperatures, the driving current may increase. At higher temperatures, the driving current may decrease. Without temperature-related corrections, there may be a substantial difference in driving current across normal display operating temperatures.

Figure 12:
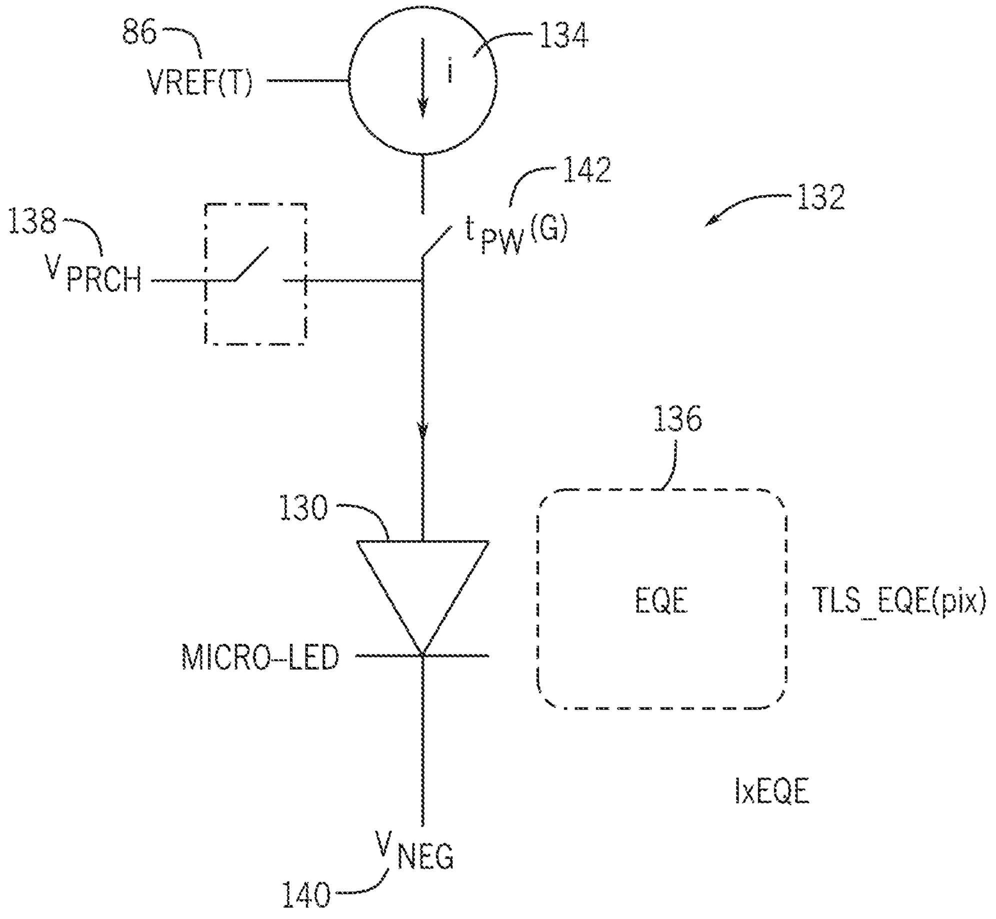
FIG. 12 is a circuit diagram of a micro-LED display pixel, in accordance with an embodiment.

FIG. 12 is a circuit diagram of a micro-LED display pixel. The micro-LED display pixel may include a micro-LED 130 and driving circuitry 132. A reference voltage (VREF) 86 is applied to the driving circuitry 132 to produce a pixel driving current (I) 134. The micro-LED 130 has an external quantum efficiency (EQE) 136. As mentioned previously, the pixel driving current (i) 134 and the external quantum efficiency (EQE) 136 have temperature dependencies. The temperature dependency of the external quantum efficiency (EQE) may be represented by a parameter denoted as temperature luminance sensitivity (TLS_EQE(pix)). The external quantum efficiency (EQE) represents the efficiency of the micro-LED 130 with emitting light based on an electric current. The higher the external quantum efficiency (EQE), the more light is emitted per unit charge that passes through the micro-LED 130. A pre-charge voltage ($V_{PRCH}$) 138 and a negative voltage ($V_{NEG}$) 140 are applied on opposite sides of the micro-LED 130. The pre-charge voltage ($V_{PRCH}$) 138 may bring the voltage on the anode side of the micro-LED up to a level where the micro-LED may be able to operate, such that the micro-LED may immediately turn on (emit light) when driven with the pixel driving current (i) 134. A digital power signal ($t_{PW}$(G)) 142 is applied to the micro-LED 130 to control a time duration in which the micro-LED is driven "on". The longer the micro-LED 130 is driven "on" by the digital power signal ($t_{PW}$(G)), the greater the amount of light that will be perceived by the human eye as originating from the micro-LED 130.

Figure 13:
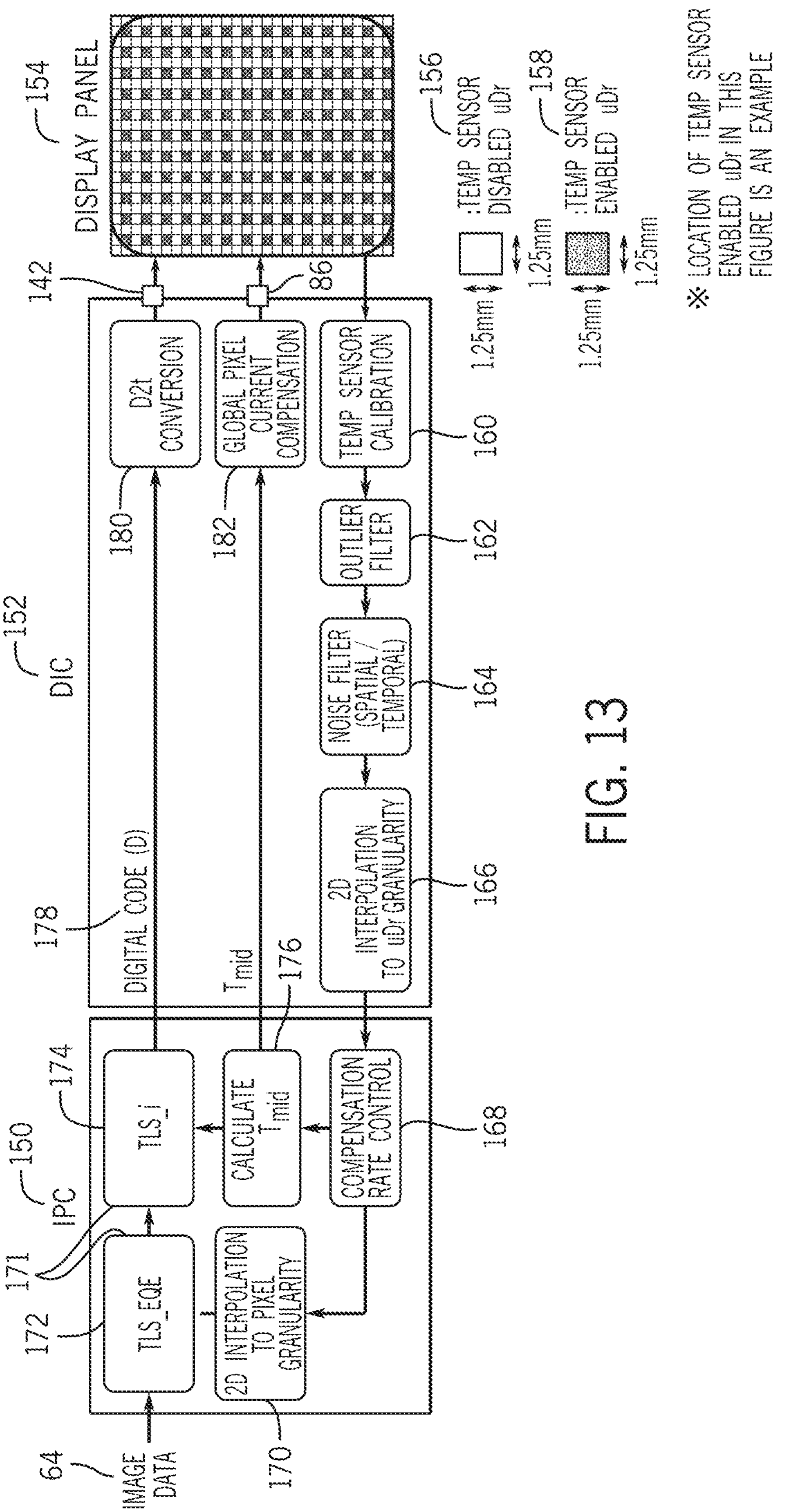
FIG. 13 is a block diagram schematically illustrating components of an electronic device that are used for temperature sensing and compensation, in accordance with an embodiment.

With the preceding in mind, FIG. 13 is a block diagram schematically illustrating components of an electronic device that are used for temperature sensing and compensation. The electronic device (e.g., handheld device, wearable device) includes an image processing circuit (IPC) 150, a driver integrated circuit (DIC) 152, and a micro-LED display panel 154. The micro-LED display panel 154 includes multiple display pixels driven by micro-drivers. Temperature sensors located inside the micro-drivers are distributed across the micro-LED display panel 154. In some embodiments, a temperature sensing grid may be as dense as micro-driver granularity (e.g., 1.25 mm×1.25 mm). Temperature sensing data output from the temperature sensors may be in form of a digital code format (e.g., 8-bit, 12-bit, 16-bit, 20-bit, 24-bit, 28-bit, 32-bit). The temperature sending data is sent to the driver integrated circuit (DIC) 152 for further processing.

The micro-drivers may include temperature sensor disabled micro-drivers 156 and temperature sensor enabled micro-drivers 158. The temperature sensing data (e.g., temperature distribution) corresponding to the temperature sensor enabled micro-drivers 158 is measured by the enabled temperature sensors. The temperature sensing data may be collected to generate a two-dimensional temperature map (e.g., measured temperature values at individual micro-driver locations).

The driver integrated circuit (DIC) 152 may provide various functions for temperature sensing and compensation. The functions may include controlling the rate and resolution of temperature sensing depending on the state of the system (e.g., always-on display mode, rate of change in temperature). For example, temperature sensing modes may include low resolution with programmable rate sensing when the rate of change in temperature is near zero or very low. The temperature sensing modes may also include high resolution with programmable rate sensing when the rate of change in temperature is high. The functions may also include configuring the temperature sensing grid at a predetermined pattern (e.g., pattern that defines the enabled/disabled temperature sensors) stored in a storage device (e.g., the storage device 22) of the electronic device 10. Further, the functions may include generating and coordinating timing control signals for the temperature sensing.

After reading the temperature sensing data from the micro-LED display panel 154, the driver integrated circuit (DIC) 152 may post-process the temperature sensing data. For example, the driver integrated circuit (DIC) 152 may determine the temperature based on electrical signals using a temperature sensor calibration 160. The temperature sensor calibration 160 may include obtaining the temperature from temperature code by, for example, applying gain/offset or temperature code to temperature conversion through a calibration lookup table after applying an offset. After temperature sensor calibration 160, the driver integrated circuit (DIC) 152 may apply an outlier filter 162 to the temperature sensing data to remove undesired outliers (e.g., large differences between the mean and max/min values of the temperature values).

Further, the driver integrated circuit (DIC) 152 may apply noise filters 164 to the temperature sensing data. For example, the driver integrated circuit (DIC) 152 may apply a temporal filter to the temperature sensing data at temperature sensing granularity (e.g., at temperature sensor enabled micro-driver granularity). The temporal filtering may filter out possible glitches (e.g., originating from sensor noise) in the temperature sensing data in a time domain. After applying the temporal filter, the driver integrated circuit (DIC) 152 may apply a spatial filter to remove spatial noises (coherent noise or random noise).

Additionally, the driver integrated circuit (DIC) 152 may perform a two-dimensional interpolation 166 based on the post-processed temperature sensing data. The two-dimensional interpolation 166 uses the post-processed temperature sensing data at the temperature sensing granularity to estimate the temperature data at micro-driver granularity that includes both the temperature sensor disabled micro-drivers 156 and the temperature sensor enabled micro-drivers 158. That is, the interpolated temperature sensing data may have an increased resolution (from the temperature sensing granularity to the micro-driver granularity) that may enable the subsequent processing by the image processing circuit (IPC) 150. For example, the driver integrated circuit (DIC) 152 may report the temperature sensing data to the image processing circuit (IPC) 150 at a fixed grid of 1.25 mm×1.25 mm at a rate controlled by the image processing circuit (IPC) 150 via a serial communication bus (e.g., I2C channel).

Other functions, such as performing data-to-time (D2t) conversion and global pixel current compensation will be described in more detail after introducing functions of the driver integrated circuit (DIC) 152. Such functions may use output from the driver integrated circuit (DIC) 152.

The image processing circuit (IPC) 150 may receive the temperature sensing data from the driver integrated circuit (DIC) 152. The image processing circuit (IPC) 150 may perform temperature compensation rate control 168. For example, the image processing circuit (IPC) 150 may compute the temperature sensing/update rate based on the state of the system (e.g., firmware entity). Additionally or alternatively, the image processing circuit (IPC) 150 may disable a two-dimensional compensation by configuration at power up.

After the temperature compensation rate control 168, the image processing circuit (IPC) 150 may calculate an average temperature ($T_{mid}$) 176 of the micro-LED display panel 154 based on the temperature sensing data. The average temperature ($T_{mid}$) 176 may be calculated by first computing a mean temperature value (e.g., average value of max/min values of the temperature) for each micro-driver and then dividing a summation of the mean temperatures of all micro-drivers by the number of the micro-drivers.

After the temperature compensation rate control 168, the image processing circuit (IPC) 150 may also perform another two-dimensional interpolation 170 based on the temperature sensing data. The two-dimensional interpolation 170 uses the temperature sensing data interpolated to the micro-driver granularity to estimate the temperature data at display pixel granularity. That is, the interpolated temperature sensing data after the two-dimensional interpolation 170 may have a further increased resolution (from the micro-driver granularity to the display pixel granularity), which may enable a subsequent two-dimensional temperature compensation 171.

The image processing circuit (IPC) 150 may apply the two-dimensional temperature compensation 171 to the incoming image data 64. As mentioned previously, the image data 64 may be transformed into a luminance domain. For example, pixel by pixel, the image processing circuit (IPC) 150 may convert a gray level of the image data 64 into a luminance value in the luminance domain representing an amount of light corresponding to the gray level. The image processing circuit (IPC) 150 may determine a first correction (denoted as temperature luminance sensitivity of external quantum efficiency (TLS_EQE)) 172 based on a lookup table (LUT) that indicates EQE correction coefficients corresponding to respective display pixels and a second correction (denoted as temperature luminance sensitivity of pixel driving current (TLS_i)) 174 based on the same lookup table or a different lookup data that indicates pixel driving current correction coefficients corresponding to respective micro-drivers.

To compensate for temperature variations associated with a display pixel, the image processing circuit (IPC) 150 may apply the first correction (TLS_EQE) 172 to the image data 64 corresponding to the display pixel to adjust the luminance value for that display pixel. Additionally, to compensate for temperature variations associated with a micro-driver, the image processing circuit (IPC) 150 may apply the second correction (TLS_i) 174 to the image data 64 corresponding to the micro-driver to adjust the luminance value for that micro-driver. By applying the two-dimensional temperature compensation, including the first and second corrections, to the image data 64, the color artifacts caused by temperature variations on the micro-LED display panel 154 may be eliminated or reduced.

After applying the two-dimensional temperature compensation, the image data 64 (in luminance) may be converted to digital code (D) 178. The image processing circuit (IPC) 150 may send the average temperature ($T_{mid}$) 176 and the digital code (D) 178 to the driver integrated circuit (DIC) 152. The driver integrated circuit (DIC) 152 may perform a data-to-time (D2t) conversion 180 based on the digital code (D) 178 to obtain the digital power signal ($t_{PW}(G)$) 142 used as a digital correction. The driver integrated circuit (DIC) 152 may apply the digital power signal ($t_{PW}(G)$) 142 to a respective micro-LED of the micro-LED display panel 154 to control a time duration in which the micro-LED is driven "on". The driver integrated circuit (DIC) 152 may also perform a global pixel driving current compensation 182 based on the average temperature ($T_{mid}$) 176 to obtain the reference voltage (VREF) 86 used as an analog correction. The driver integrated circuit (DIC) 152 may apply the reference voltage (VREF) 86 to the display pixels of the micro-LED display panel 154 to compensate for the display temperature variations. The global pixel driving current compensation 182 may result in the same adjustment of the display pixel driving current to all the display pixels that may account for current average temperature on the micro-LED display panel 154.

Figure 14:
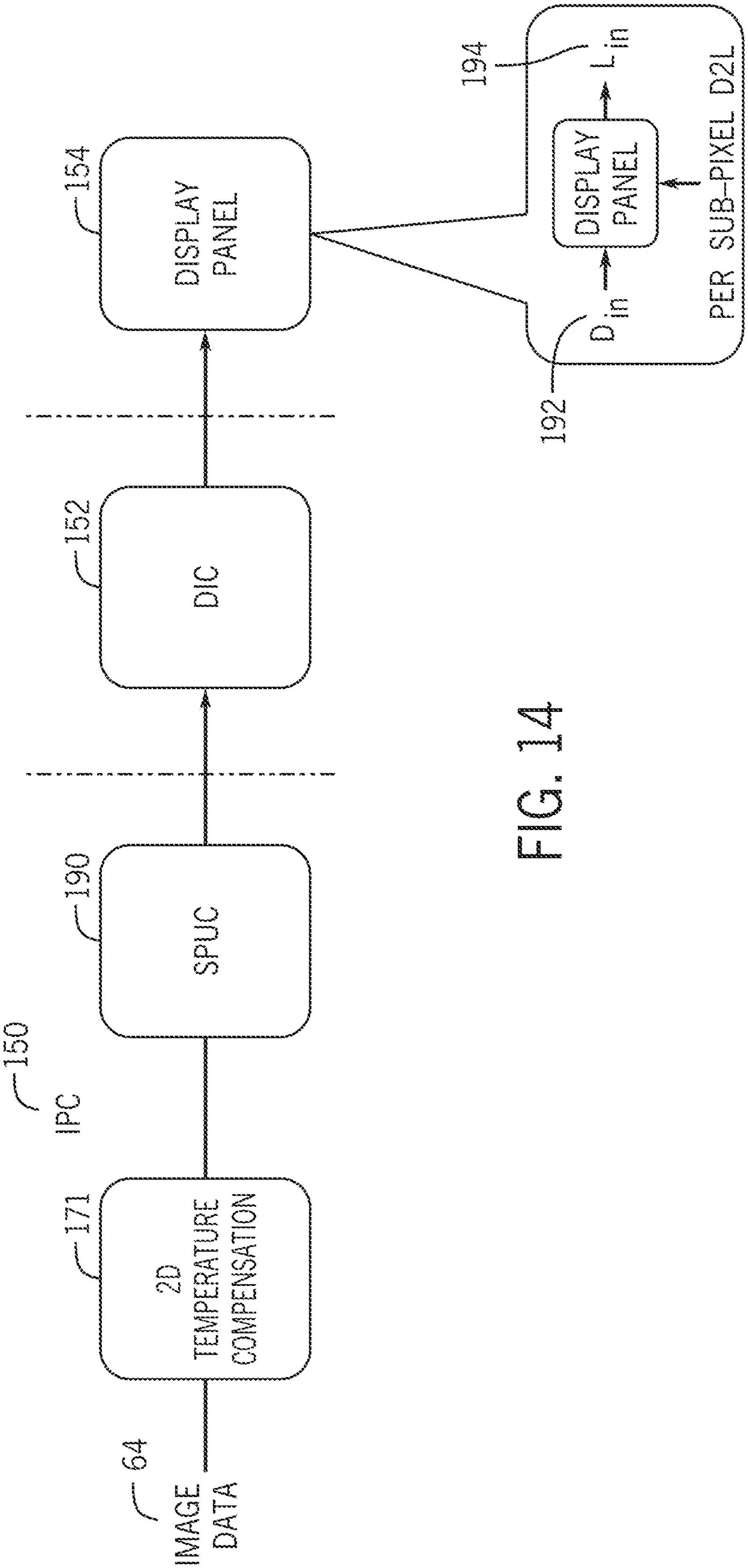
FIG. 14 is a block diagram associated with a pipeline for temperature compensation of FIG. 13, in accordance with an embodiment.

FIG. 14 is a block diagram associated with a pipeline for temperature compensation of FIG. 13. The image processing circuit (IPC) 150 may provide various functions to applied to the image data 64, such as the two-dimensional interpolation 170, the first correction (TLS_EQE) 172, and the second correction (TLS_i) 174. Additionally, the image processing circuit (IPC) 150 may perform a sub-pixel uniformity compensation (SPUC) 190 to the image data 64 to further reduce the color artifacts caused by the EQE mismatch, the pixel driving current mismatch, the capacitance mismatch, and so on. Such color artifacts may include residual noise after applying the two-dimensional temperature compensation 171.

The driver integrated circuit (DIC) 152 may use the image data 64 to generate digital code (D) 178 to provide to the micro-LED display panel 154. Each subpixel may have different data-to-luminance (D2L) characteristics (e.g., different EQE, capacitance, pixel driving current, and temperature profile). The data-to-luminance (D2L) conversion may be understood essentially as the result of an input signal ($D_{in}$) 192 corresponding to a digital code generated by the DIC 152 based on the image data 64 at the respective display pixel that results in an output signal (L in) 194.

Figure 15:
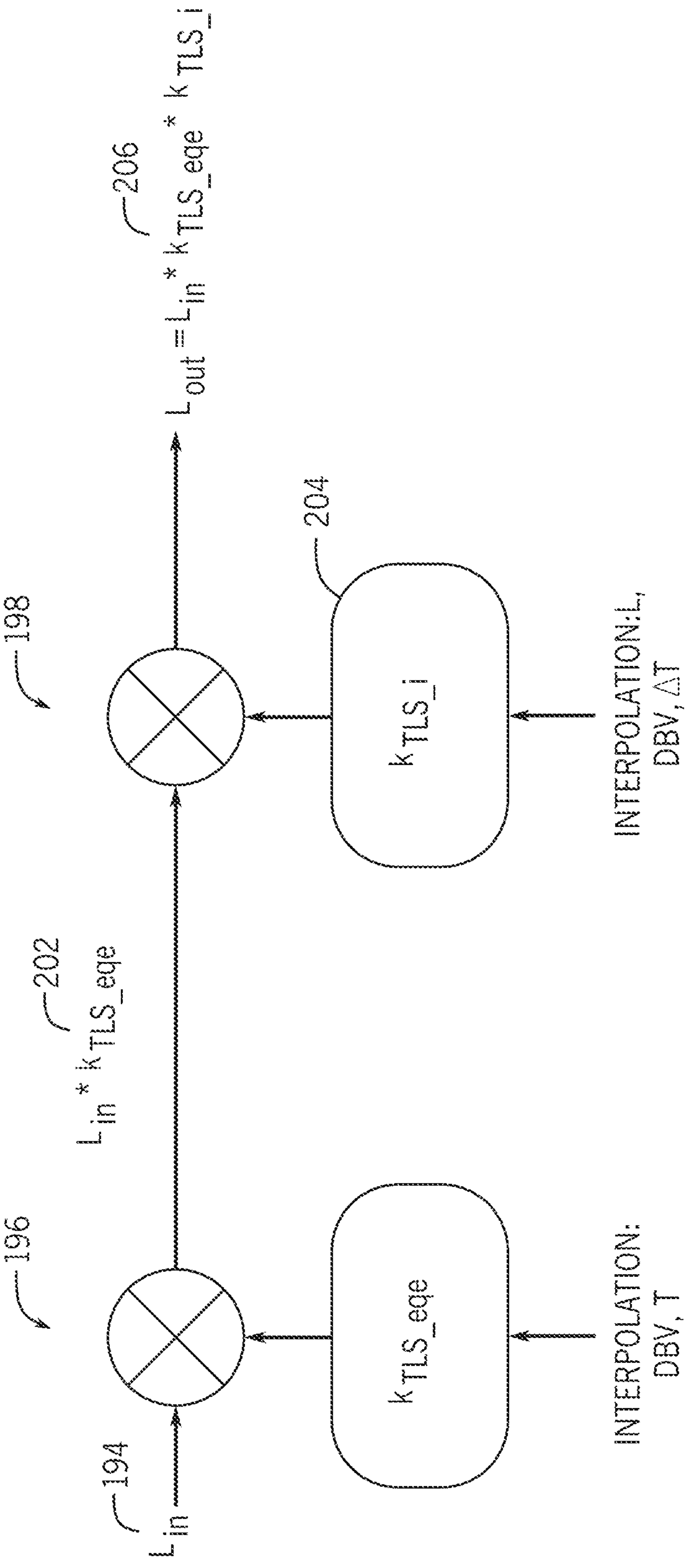
FIG. 15 illustrates a block diagram of a temperature luminance sensitivity (TLS) compensation architecture, in accordance with an embodiment.

With forgoing in mind, FIG. 15 illustrates a block diagram of a temperature luminance sensitivity (TLS) compensation architecture. The output signal ($L_{in}$) 194 may pass through two gain blocks 196 and 198. In the gain block 196, EQE correction coefficients ($k_{TLS\_eqe}$) 200 corresponding to respective display pixels may be interpolated in a global display brightness value (DBV) and temperature (T) domain due to the micro-LED characteristics. The EQE correction coefficients ($k_{TLS\_eqe}$) 200 may be applied (e.g., by convolution) to the signal (L in) 194 to obtain intermediate output image data ($L_{in}*k_{TLS\_eqe}$) 202.

Further, in the gain block 198, pixel driving current correction coefficients ($k_{TLS\_i}$) 204 corresponding to respective micro-drivers may be interpolated in luminance (L), brightness value (DBV), and temperature variation (ΔT) domain. The luminance (L) is used due to non-linearity in slow charging regime of the micro-LED. Instead of the temperature (T), the temperature variation (ΔT) is used due to the global pixel current compensation. The pixel driving current correction coefficients ($k_{TLS\_i}$) 204 may to applied (e.g., by convolution) to the intermediate output image data ($L_{in}*k_{TLS\_eqe}$) 202 to obtain final output image data ($L_{in}*k_{TLS\_eqe}*k_{TLS\_i}$) 206.

Figure 16:
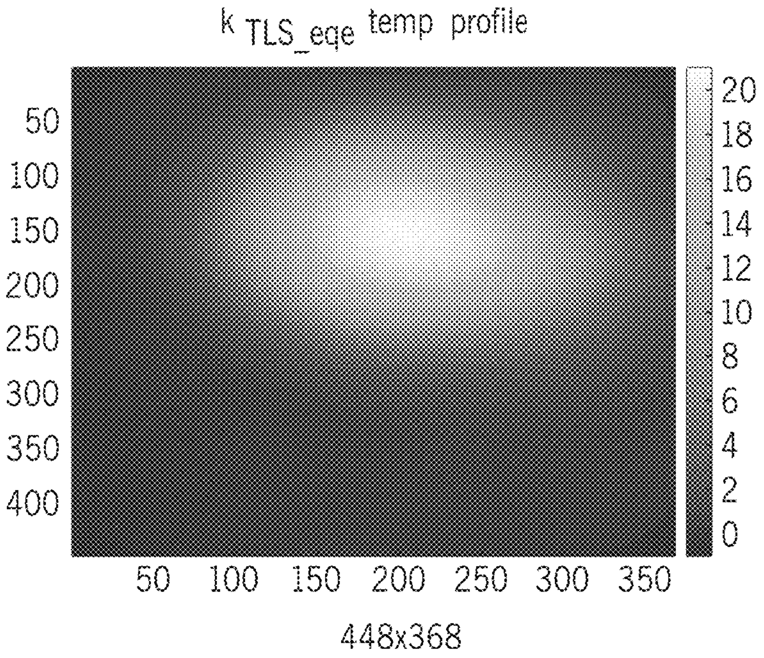
FIG. 16 is an example temperature profile that is used to determine correction coefficients for compensating temperature effect on the display pixels, in accordance with an embodiment.

FIG. 16 is an example temperature profile that is used to determine correction coefficients (e.g., the EQE correction coefficients ($k_{TLS\_eqe}$) 200) for compensating temperature effect on the display pixels. An interpolation may use such pixel level granularity temperature profile because the first correction (TLS_EQE) 172 compensates for external quantum efficiency temperature luminance sensitivity (EQE_TLS) on individual micro-LEDs.

Figure 17:
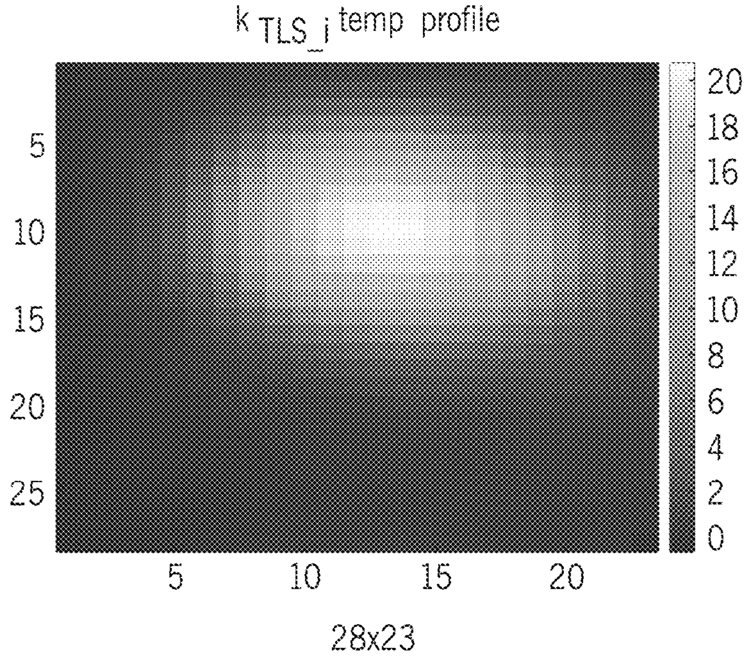
FIG. 17 is another example temperature profile that is used to determine correction coefficients for compensating temperature effect on the micro-drivers, in accordance with an embodiment.

FIG. 17 is another example temperature profile that is used to determine correction coefficients (e.g., the pixel driving current correction coefficients (kTLS_i) 204) for compensating temperature effect on the micro-drivers. An interpolation may use such micro-driver level granularity temperature profile because the second correction (TLS_i) 174 compensates for pixel driving current temperature luminance sensitivity (i_TLS) on individual micro-drivers.

Figure 18:
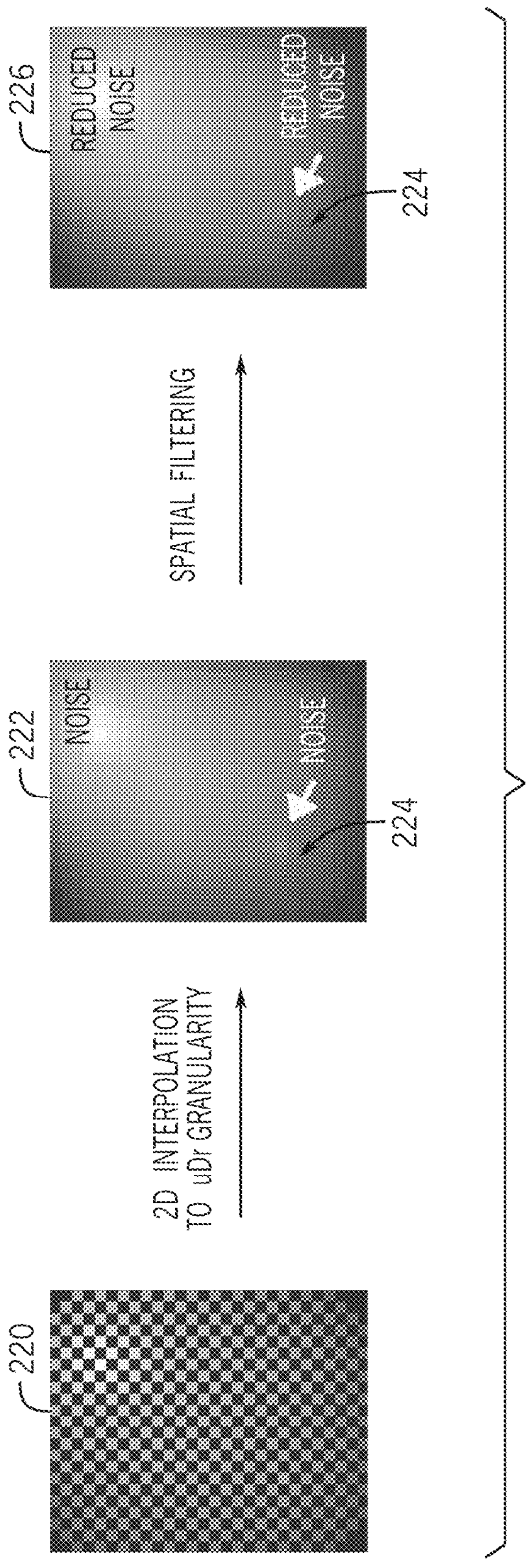
FIG. 18 is an example image processing of a temperature profile, in accordance with an embodiment.

FIG. 18 is an example image processing of a temperature profile 220. In present example, the temperature profile 220 may be at a coarse granularity (e.g., the temperature sensing granularity corresponding to the enabled temperature sensors in certain micro-drivers). A two-dimensional interpolation is applied to the temperature profile 220 to obtain an intermediate temperature profile 222 at finer micro-driver granularity. Compared to the temperature profile 220, the intermediate temperature profile 222 has improved image resolution. The two-dimensional interpolation may introduce certain noise, as shown in the intermediate temperature profile 222 at a location 224. A spatial filter is then applied to the intermediate temperature profile 222 to obtain an output temperature profile 226 with reduced noise at the location 224. The output temperature profile 226 may be used for subsequent processing such as another two-dimensional interpolation that interpolate the output temperature profile 226 to even finer display pixel granularity.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:

obtaining temperature data of a display of an electronic device, wherein the temperature data comprises:

an average temperature on an entire area of the display; and a temperature distribution across the entire area of the display; and performing corrections on the display based on the temperature data, wherein the corrections comprise:

a first correction to compensate for the average temperature based on a global pixel driving current compensation for the display based on the average temperature; and a second correction to compensate for the temperature distribution on the display.

2. The method of claim 1, wherein the display comprises a micro light-emitting diode (micro-LED) display and wherein the temperature data comprises temperature values obtained from a plurality of micro-drivers of the micro-LED display.

3. The method of claim 1, wherein the average temperature is calculated by:

computing a mean temperature based on an average value of maximum and minimum values of temperature measurement for each driving circuitry of a plurality of driving circuitries of a plurality of pixels on the display; and dividing a summation of mean temperature values of the plurality of driving circuitries by a number of the plurality of driving circuitries to obtain the average temperature.

4. The method of claim 1, wherein the temperature distribution on the display comprises a two-dimensional temperature map.

5. The method of claim 1, wherein the temperature distribution is obtained using a plurality of temperature sensors located inside a plurality of driving circuitries of a plurality of pixels on the display.

6. The method of claim 5, wherein the plurality of temperature sensors is enabled or disabled based on a specified pattern stored in a storage device of the electronic device.

7. The method of claim 1, wherein the first correction comprises an analog correction to account for the average temperature on the display.

8. The method of claim 1, wherein the second correction comprises a digital correction to compensate for a temperature effect on an efficiency of each pixel of a plurality of pixels on the display.

9. The method of claim 8, wherein the digital correction is determined using a lookup table indicating external quantum efficiency (EQE) correction coefficients corresponding to respective display pixels of the plurality of pixels.

10. The method of claim 1, wherein the second correction comprises a digital correction to compensate for a temperature effect on a driving circuitry of each pixel of a plurality of pixels on the display.

11. The method of claim 10, wherein the digital correction is determined using a lookup table indicating pixel driving current correction coefficients corresponding to respective driving circuitries of the plurality of pixels.

12. An electronic device, comprising:

an electronic display comprising a plurality of display pixels configured to:

display image content; and output temperature data of the electronic display, wherein the temperature data comprises data indicative of a temperature distribution on the electronic display; and processing circuitry configured to:

convert a gray level of image data into luminance values of the image data;

interpolate the temperature data to a pixel driver level;

calculate an average temperature on the electronic display based on the temperature data at the pixel driver level;

perform a first correction to an analog electrical supply to the electronic display to compensate for the average temperature;

interpolate the temperature data at the pixel driver level to a pixel level; and perform a second correction to the image content to compensate for the temperature distribution on the electronic display.

13. The electronic device of claim 12, wherein the first correction comprises adjusting a reference voltage on a plurality of pixel drivers of the plurality of display pixels to compensate for the average temperature.

14. The electronic device of claim 12, wherein the second correction comprises adjusting the luminance values of the image data to compensate for the temperature distribution on the electronic display.

15. The electronic device of claim 14, wherein the processing circuitry is configured to convert the adjusted luminance values of the image data to a digital code form that corresponds to an amount of time light is emitted from each display pixel of the plurality of display pixels.

16. The electronic device of claim 12, wherein the temperature data is acquired by a plurality of temperature sensors distributed on the electronic display, and wherein the processing circuitry is configured to apply a temperature sensor calibration to the temperature data.

17. The electronic device of claim 12, wherein the processing circuitry is configured to apply an outlier filter to the temperature data.

18. The electronic device of claim 12, wherein the processing circuitry is configured to apply a noise filter to the temperature data, and wherein the noise filter comprises a spatial filter, a temporal filter, or a combination thereof.

19. A system comprising:

driver circuitry configured to:

receive temperature data acquired by a plurality of temperature sensors distributed in a plurality of pixel drivers driving a plurality of display pixels of a display;

process the temperature data; and apply a first interpolation to the processed temperature data to obtain a first temperature distribution at a pixel driver resolution; and image processing circuitry configured to:

compute an average temperature of the display based on the first temperature distribution;

send the average temperature to the driver circuitry for performing a first correction to compensate for the average temperature;

apply a second interpolation to the first temperature distribution to obtain a second temperature distribution at a display pixel resolution; and perform a second correction to compensate for the second temperature distribution.

20. The system of claim 19, wherein processing the temperature data comprises applying a temperature sensor calibration, an outlier filtering, a temporal filtering, and a spatial filtering.

21. The system of claim 19, wherein the pixel driver resolution in the first temperature distribution is lower than the display pixel resolution in the second temperature distribution.

* * * * *